United States Patent Office 3,367,024
Patented Feb. 6, 1968

3,367,024
METHOD FOR PRODUCING A SELENIUM RECTIFIER HAVING A HIGH BLOCKING VOLTAGE
Heinz Eggert, Reinhard Schatz, and Ekkehard Schillmann, Berlin, Germany, assignors to Siemens-Schuckertwerke Aktiengesellschaft, Berlin, Germany, a corporation of Germany
Filed Aug. 2, 1965, Ser. No. 476,639
Claims priority, application Germany, Aug. 5, 1964, S 92,463
13 Claims. (Cl. 29—585)

The present invention relates to a method for producing a selenium rectifier. More particularly, the invention relates to a method for producing a selenium rectifier having a high blocking voltage or high blocking capacity.

In the field of communications there is a growing demand for rectifiers for high voltages and small currents. For this purpose selenium rectifiers having high blocking voltage or high blocking capacity or characteristics are especially suitable, due to their low cost. Rectifiers of this type may be used, for example, in television sets for the purpose of rectifying the electron accelerating voltage. There are many methods of increasing the blocking capacity of selenium rectifiers. The improvement of the blocking capacity, however, as a rule reduces the conductance characteristic of the rectifier.

The principal object of the present invention is to provide a new and improved method for producing a selenium rectifier having a high blocking capacity.

An object of the present invention is to provide a method for producing a selenium rectifier having a high blocking capacity and a plate with a small diameter, up to 10 mm.

In accordance with the present invention, the method for producing a selenium rectifier having a high blocking voltage comprises the steps of:
Providing a carrier plate with a selenium layer;
Adding to said selenium layer a halide in a maximum amount of about 30 m. percent atomic ratio to selenium;
Providing an insulation layer around the edge of said selenium layer;
Covering said selenium layer and said insulation layer with a cover electrode;
Adding thallium to said cover electrode; and
Electrically forming said rectifier with direct current.

In order that the present invention may be readily carried into effect, it will now be described with reference to the accompanying drawings, wherein.

In the figures, the same components are identified by the same reference numerals.

Figure 2:
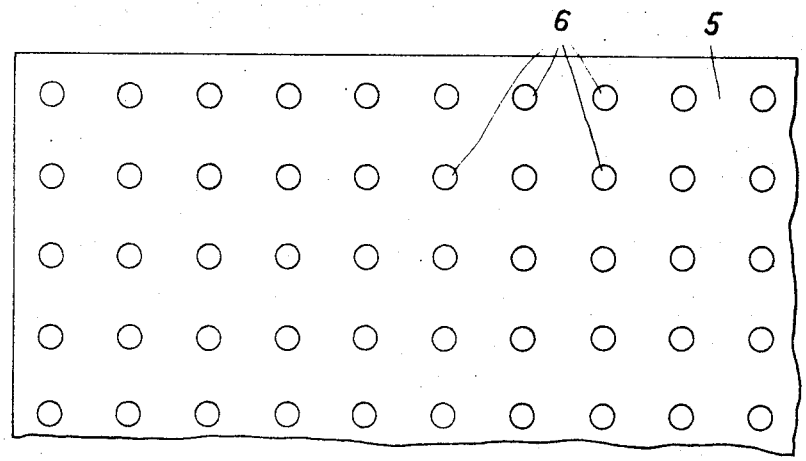
FIG. 2 is a plan view of FIG. 1.

It is known to provide the selenium layer of a selenium rectifier with a halide of approximately 10 to 80 m%, or millpercent atomic ratio, in relation to the selenium. In accordance with the invention, the lower portion of this range is utilized. It is also known that a relatively small amount of halide increases the blocking capacity and that adding thallium to the cover electrode produces the same effect.

The invention relates to small plates, and in small plates, these measures are to a large degree ineffective, because the back or blocking current is determined by the constantly disturbed conditions at the edge of the plate. In the method of the present invention, these edge effects are eliminated by providing an insulating layer at the edge of the plate. Only the central area of the plate, which is maintained free of the insulation layer, thus affects the blocking current, so that the relatively small amounts of halide and thallium added to the cover electrode have a full effect on the blocking capacity.

The high blocking capacity of the plate and the use of an insulating layer in the edge area create problems in the electric forming of the plate. Since the plate has a relatively high blocking capacity prior to electric forming, an appropriately high voltage is required even at the start of the electric forming. If an alternating voltage of, for example, 60 v.$_{eff}$ were used for this purpose, its peak voltage would amount to over 80 v. and thus come close to the breakdown voltage of the blocking layer. It has been shown that the breakdown voltage is approximately the same in all selenium rectifiers with a natural blocking layer. The aforedescribed difficulty is avoided by utilizing a direct voltage of about 70 v.

Considerable heat loss through heat dissipation occurs during electric forming. The heat loss increases the temperature of the element to be formed and such increase in temperature may be favorable for the forming process. In the rectifier plates produced in accordance with the method of the present invention, the active rectifier area is relatively small compared to the total area, due to the insulating layer provided on the plates. This may prevent the element from reaching the desired temperature increase during electric forming. Thus, if necessary, an outside heating arrangement may be provided during electric forming which would increase the temperature of the element to about 70° C.

In addition to the halide, a metal, containing about 1 to 20 m%, or millpercent atomic ratio of the amount of halide, may be provided at the main portion of the selenium layer to further increase the conductance capacity or conductance characteristic of the selenium layer. The metals particularly suitable for this purpose are antimony, bismuth, tin, tellurium, thallium, indium, gallium, iron and cerium.

In order to increase the blocking capacity further, 20 to 200 m. percent by weight of thallium relative to selenium may be used in a relatively thin partial layer adjacent the blocking layer, opposite the main portion of the selenium layer. It is preferable to relate the concentration of the thallium in the metal of the cover electrode to the concentration of the thallium in the selenium partial layer. Particularly desirable rectifier properties or characteristics result if the percentage by weight of the thallium content in the metal of the cover electrode has a ratio to the thallium content of the selenium partial layer in the range of 1:100 to 1:10. The principal purpose for the addition of thallium to the cover electrode is to prevent the diffusing out of the thallium provided in the selenium layer, to the cover electrode. The thallium to thallium concentration ratio is preferably between 1:40 and 1:15.

Tests conducted with selenium rectifiers having a selenium partial layer of 3 microns thickness and a thallium content of 100 m. percent by weight and a cover electrode without added thallium, indicate that during thermal and electric forming, after the cover electrode is provided and after prolonged and continuous operation, about one third of the thallium enters the cover electrode. When the cover electrode has a conventional thickness of about 50 microns, the resulting thallium content in the cover electrode is about 1 m. percent by weight, if there is an even distribution of the cover electrode solder. A considerable gradient of the thallium content to the surface of the electrode cover exists during the forming process however, so that, under the aforedescribed circumstances, in accordance with the present invention, the amount of thallium added to the cover electrode is preferably from 2.5 to 6.5 m. percent by weight. The absolute thallium content of the cover electrode is then about 1 to $2.6 \times 10^{-6}$ grams per cm.$^2$ of the rectifier area and is therefore about the same as the thallium content of the selenium partial layer of about $1.5 \times 10^{-6}$ grams per cm.$^2$. It was established that the thallium distribution also remains almost the same during further operation of the rectifier, especially since the operating temperature is far below the forming temperatures.

While the blocking capacity is high, the total thallium content of the selenium rectifier produced in accordance with the present invention, is very low and hence said rectifier very resistant to aging.

It is of particular advantage to finally convert the selenium layer into the best possible conducting, hexagonally crystallized, modification, in an enclosed or covered conversion, that is, after the cover electrode has been provided and at a temperature of a few degrees below the melting point, for a period of 15 minutes at the most. A thermal forming at high temperatures such as, for example, 218° C., and of short duration, produces not only a good blocking capacity, but a maximum conductivity of the selenium layer.

During thermal forming, the selenium rectifier element is usually led through a furnace having an appropriate temperature. However, the element does not absorb or acquire the temperature of the furnace walls instantaneously, but only after a more or less short time. The temperature depends, among other things, upon the thermal or heat capacity of the element. The maximum temperature may be reached considerably faster by utilizing as a carrier plate a metal sheet of low heat capacity or low heat absorption, that is less than 0.03, and preferably less than 0.02 calories per ° C. and cm.$^2$ area. For example, an aluminum sheet having a thickness of less than 0.3 mm. and a heat capacity of less than 0.017 calories per ° C. and cm.$^2$ is suitable for this purpose.

The pre-treatment of such a thin aluminum sheet creates problems which require specific solutions. It is of disadvantage to provide roughening by sand blasting as is usual in the selenium rectifier art, because the main sheet may become twisted or warped during the sanding process. Furthermore, the grain size of the sand used, and thus also the pore or pit size of the roughened surface may adversely affect the active rectifier area in very small plates.

In the method of the present invention, the aluminum carrier plate is preferably roughened by chemical or electrochemical process such as, for example, an electrolytic roughening process. In an aluminum carrier plate, a preferable method is one which iron-plates the aluminum surface simultaneously with roughening. A current-free method immerses the aluminum in a bath containing 12 to 45% iron (III) chloride in a hydrochloric, watery solution having a 10% hydrochloride maximum.

Figure 1:
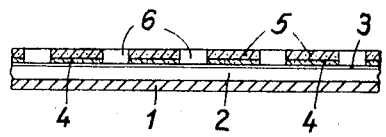
FIG. 1 is a sectional view of an embodiment of a plurality of selenium rectifier plates produced by the method of the present invention.

In FIG. 1, a carrier plate comprises an aluminum sheet, for example 0.2 mm. thick, roughened by a chemical or electrochemical process iron-plated, and nickel-plated in a known manner. The nickel coating is partly converted into nickel selenium, also in a known manner, for example, by sprinkling or dusting selenium powder on the nickel surface and by effecting a reaction with the nickel by tempering at increased temperatures. The nickel selenium coating provides a barrier-free contact to the selenium layer.

A selenium partial layer 2 is vapor-deposited on the surface of the carrier plate 1, prepared in the aforedescribed manner. The selenium partial layer 2 has a relatively low chloride content, for example 3 m. percent by weight of chloride, and includes a metal of for example 5 m. percent atomic ratio relating to chloride. The added metal may comprise, for example, indium, gallium, tellurium, iron. The selenium partial layer 2 may be approximately 45 microns in thickness. During the vapor-depositing process of the selenium partial layer 2, the carrier plate 1 may be kept at a higher temperature of for example 100 to 130° C., so that the layer 2 is pre-crystallized while being deposited.

An additional, essentially thinner, selenium partial layer 3 is vapor-deposited upon the selenium partial layer 2. Basically, the selenium partial layer 3 contains no additional material for increasing conductivity. However, it includes thallium of 20 to 200 m. percent by weight such as, for example, 100 m. percent by weight, for increasing the blocking capacity of the rectifier. The selenium partial layer 3 may be about 3 to 5 microns thick. It is preferably applied at a temperature of less than 100° C., which is the temperature of the carrier plate, so that it remains amorphous, at first.

With the aid of an adhesive material 4, a paper layer 5 is affixed to the selenium partial layer 3. The paper layer 5 is provided with a pattern of perforations 6. The adhesive material 4 preferably comprises a sticky or tacky varnish which dries only physically in a low temperature region and which hardens irreversibly in a higher temperature region, below 220° C., due to changes in chemical conditions, and which is cohesive in a thermoplastic condition within a temperature region between the merely physical drying and the hardening.

A suitable adhesive varnish of the aforementioned type may comprises, for example, linear or branched polyesters of adipin acid, phthalic acid or isophthalic acid with multivalent alcohols. The varnish may also comprise a portion of hydroxyl-group containing acetales of aliphatic alcohols and an additional portion of aliphatic or aromatic isocyanates, whose reactive isocyanate groups are blocked. Adhesives of this type are especially adapted for the requirements of the aforementioned covered conversion. The adhesion is accomplished under pressure, at a temperature of for example 100 to 120° C., during which time the adhesive 4, which at that point had only been applied to the selenium partial layer 3 and had dried physically, softens by thermoplastic means.

A cover electrode 7, for example 50 microns thick, is sprayed onto the paper layer 5 and the exposed areas of the selenium partial layer 3. The cover layer 7 preferably comprises a cover solder consisting of approximately 80% cadmium and approximately 20% tin and whose melting point lies above 218° C., which is the temperature of the final conversion. Also, the solder of the cover electrode includes 1 to 10 m. percent thallium, which has a ratio to the thallium content of the selenium partial layer 3 of 1:20. The selenium partial layer 3 may, for example, include 100 m. percent thallium and the cover electrode 7 may then correspondingly include 5 m. percent thallium.

Figure 3:
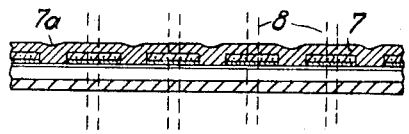
FIG. 3 is a sectional view of the embodiment of FIG. 1 after the provision of the cover electrode.

The cover electrode 7 is illustrated in FIG. 3, which shows a section through the carrier plate after the provision of the cover electrode. Since the cover electrode does not melt during the ensuing treatment, including the final conversion of the selenium layer, it remains porous, so that gases produced by the adhesive and the paper may escape. The selection of a cover electrode material having a melting point which exceeds the temperature of the final conversion permits the flat depressions 7a, occurring above the perforations 6 of the paper layer 5 to remain intact and thereby prevent compression of the active blocking layer while it is under spring pressure.

The completely covered device, as shown in FIG. 3, is heated to a temperature of about 150° C., at which the varnish or adhesive layer 4 hardens due to a poly addition and a cross-linkage or lattice-like polymerization. The age-hardening of the varnish 4 requires about 15 hours, at a temperature of about 150° C.

After the age-hardening of the adhesive varnish 4, the final conversion is accomplished. The final conversion may require, for example, 10 minutes at 218° C., and involves the conversion of the selenium of layers 2 and 3 into the best conducting hexagonal modification. At the same time, a reaction intermediary layer forms between the layers 3 and 7, comprising cadmium selenide which is decisive for the blocking capacity of the rectifier and for which the addition of thallium is of primary importance. As previously mentioned, the relatively small thallium content in the cover electrode 7 considerably prevents the diffusion of thallium from the selenium partial layer 3 to the cover electrode 7.

The rectifier plate is then electrically formed with direct current of for example 70 v. by using a compensating or barrier resistance. If necessary, the plate is maintained at a temperature of for example 70° C. by an outside heating device. After an hour, a final voltage of about 60 v. or more is provided at the plate.

Figure 4:
FIG. 4 is a plan view of a single selenium rectifier plate produced by the method of the present invention.

After the electric forming, rectifier plates 9 are obtained from the entire rectifier plate by punching out the individual plates along the broken lines 8 of FIG. 3. One such rectifier plate is shown in top view in FIG. 4. The active area of the individual rectifier plate is limited to the central region 10 which is defined by the perforations 6 in the paper layer 5. During operation, both surfaces of the rectifier plate 9 are usually under contact pressure, which is exerted either via adjacent bordering plates or adjacent contacts or connections. The depressions 7a shown in FIG. 3, prevent the pressure from acting upon the active part of the plate surface.

Experience has shown that mechanical stress exerted upon the plates during the punching out process, somewhat reduces the blocking capacity of said plates. It is therefore preferable to after-form, also with direct current, to again increase the blocking capacity. The after-forming may be performed at individual rectifier plates 9 or after several plates have been assembled at the stack of rectifier plates. The after-forming takes only a few minutes.

While the invention has been described by means of a specific example and in a specific embodiment, we do not wish to be limited thereto, for obvious modifications will occur to those skilled in the art without departing from the spirit and scope of the invention.

We claim:

1. A method for producing a selenium rectifier having a high blocking capacity, comprising the steps of
   providing a carrier plate with a selenium layer;
   adding to said selenium layer a halide in a maximum amount of about 30 m. percent atomic ratio to selenium;
   providing an insulation layer around the edge of said selenium layer;
   covering said selenium layer and said insulation layer with a cover electrode;
   adding thallium to said cover electrode; and
   electrically forming said rectifier with direct current.

2. A method for producing a selenium rectifier having a high blocking capacity, comprising the steps of
   providing a carrier plate with a selenium layer;
   adding to said selenium layer a halide in a maximum amount of about 30 m. percent atomic ratio to selenium;
   further adding to said selenium layer a metal in an amount in the range of about 1 to 20 m. percent atomic ratio to halide from the group of metals consisting of antimony, bismuth, tin, tellurium, thallium, indium, galliums, iron and cerium;
   providing an insulation layer around the edge of said selenium layer;
   covering said selenium layer and said insulation layer with a cover electrode;
   adding thallium to said cover electrode; and
   electrically forming said rectifier with direct current.

3. A method for producing a selenium rectifier having a high blocking capacity, comprising the steps of
   providing a carrier plate with a first selenium partial layer;
   providing said first selenium partial layer with a second selenium partial layer;
   adding to said first selenium partial layer a halide in a maximum amount of about 30 m. percent atomic ratio to selenium;
   adding to said second selenium partial layer thallium in an amount in the range of about 20 to 200 m. percent by weight relative to selenium;
   providing an insulation layer around the edge of said second selenium partial layer;
   covering said second selenium partial layer and said insulation layer with a metal cover electrode;
   adding thallium to said cover electrode; and
   electrically forming said rectifier with direct current.

4. A method for producing a selenium rectifier having a high blocking capacity, comprising the steps of
   providing a carrier plate with a first selenium partial layer;
   providing first said selenium partial layer with a second selenium partial layer;
   adding to said first selenium partial layer a halide in a maximum amount of about 30 m. percent atomic ratio to selenium;
   further adding to said first selenium partial layer a metal in an amount in the range of about 1 to 20 m. percent atomic ratio to halide from the group of metals consisting of antimony, bismuth, tin, tellurium, thallium, indium, gallium, iron and cerium;
   adding to said second selenium partial layer thallium in an amount in the range of about 20 to 200 m. percent by weight relative to selenium;
   providing an insulation layer around the edge of said second selenium partial layer;
   covering said second selenium partial layer and said insulation layer with a metal cover electrode;
   adding thallium to said cover electrode; and
   electrically forming said rectifier with direct current.

5. A method for producing a selenium rectifier having a high blocking capacity, comprising the steps of
   providing a carrier plate with a first selenium partial layer;
   providing said first selenium partial layer with a second selenium partial layer;
   adding to said first selenium partial layer a halide in a maximum amount of about 30 m. percent atomic ratio to selenium;
   adding to said second selenium partial layer thallium in an amount in the range of about 20 to 200 m. percent by weight relative to selenium;
   providing an insulation layer around the edge of said second selenium partial layer;
   covering said second selenium partial layer and said insulation layer with a metal cover electrode;
   adding thallium to said cover electrode in a thallium-to-metal concentration whose ratio to the thallium concentration of said second partial selenium layer is in the range of 1:100 to 1:10; and
   electrically forming said rectifier with direct current.

6. A method for producing a selenium rectifier according to claim 5, wherein said ratio of said respective thallium concentrations is in the range of 1:40 to 1:15.

7. A method for producing a selenium rectifier having a high blocking capacity, comprising the steps of
   providing a carrier plate with a selenium layer;
   adding to said selenium layer a halide in a maximum amount of about 30 m. percent atomic ratio to selenium;
   providing an insulation layer around the edge of said selenium layer covering said selenium layer and said insulation layer with a cover electrode;
   adding thallium to said cover electrode;
   heating said rectifier to a temperature several degrees below the melting point of selenium for a maximum period of 15 minutes; and
   electrically forming said rectifier with direct current.

8. A method for producing a selenium rectifier having a high blocking capacity, comprising the steps of
providing a carrier plate with a selenium layer;
adding to said selenium layer a halide in a maximum amount of about 30 m. percent atomic ratio to selenium;
providing an insulation layer around the edge of said selenium layer;
covering said selenium layer and said insulation layer with a cover electrode comprising an alloy having a determined high melting point;
adding thallium to said cover electrode;
heating said rectifier to a temperature several degrees below the melting point of selenium for a maximum period of 15 minutes; and
electrically forming said rectifier with direct current.

9. A method for producing a selenium rectifier having a high blocking capacity, comprising the steps of
providing a carrier plate of a metal having a heat capacity of less than 0.03 calorie per ° C. and cm.$^2$ area;
providing said carrier plate with a selenium layer;
adding to said selenium layer a halide in a maximum amount of about 30 m. percent atomic ratio to selenium;
providing an insulation layer around the edge of said selenium layer;
covering said selenium layer and said insulation layer with a cover electrode comprising an alloy having a determined high melting point;
adding thallium to said cover electrode;
heating said rectifier to a temperature several degrees below the melting point of selenium for a maximum period of 15 minutes; and
electrically forming said rectifier with direct current.

10. A method for producing a selenium rectifier having a high blocking capacity, comprising the steps of
providing an aluminum carrier plate having a thickness less than 0.3 mm.;
providing said carrier plate with a selenium layer;
adding to said selenium layer a halide in a maximum amount of about 30 m. percent atomic ratio to selenium;
providing an insulation layer around the edge of said selenium layer;
covering said selenium layer and said insulation layer with a cover electrode comprising an alloy having a determined high melting point;
adding thallium to said cover electrode;
heating said rectifier to a temperature several degrees below the melting point of selenium for a maximum period of 15 minutes; and
electrically forming said rectifier with direct current.

11. A method for producing a selenium rectifier having a high blocking capacity, comprising the steps of
providing a chemically roughened aluminum carrier plate having a thickness less than 0.3 mm.;
providing said carrier plate with a selenium layer;
adding to said selenium layer a halide in a maximum amount of about 30 m. percent atomic ratio to selenium;
providing an insulation layer around the edge of said selenium layer;
covering said selenium layer and said insulation layer with a cover electrode comprising an alloy having a determined high melting point;
adding thallium to said cover electrode;
heating said rectifier to a temperature several degrees below the melting point of selenium for a maximum period of 15 minutes; and
electrically forming said rectifier with direct current.

12. The method of producing a selenium rectifier, comprising the steps of providing a carrier plate with a selenium main layer and adding thallium to a partial layer at the surface of said main layer, covering the selenium with a metal cover electrode to which thallium is added, the thallium addition in the cover electrode metal having a concentration related to the thallium concentration in said selenium partial layer in accordance with a ratio of 1:100 to 1:10 in percent by weight.

13. The method according to claim 12, said ratio being 1:40 to 1:15.

References Cited
UNITED STATES PATENTS

| | | | |
|---|---|---|---|
| 2,444,255 | 6/1948 | Hewlett | 29—583 |
| 2,510,322 | 6/1950 | Shearer | 29—585 |
| 2,819,433 | 1/1958 | Smith | 29—583 X |

WILLIAM I. BROOKS, *Primary Examiner.*